United States Patent
Nuijen et al.

(10) Patent No.: US 10,914,624 B2
(45) Date of Patent: Feb. 9, 2021

(54) CLIP-SCOOP WITH ANTI-SLIPPING FUNCTIONALITY

(71) Applicant: NESTEC S.A., Vevey (CH)

(72) Inventors: Rik Nuijen, Linden (NL); Angela Schoenmakers, Udenhout (NL); Rafael Schraml, Konolfingen (CH)

(73) Assignee: Societe des Produits Nestle S.A., Vevey (CH)

( * ) Notice: Subject to any disclaimer, the term of this patent is extended or adjusted under 35 U.S.C. 154(b) by 374 days.

(21) Appl. No.: 15/527,493

(22) PCT Filed: Oct. 29, 2015

(86) PCT No.: PCT/EP2015/075068
§ 371 (c)(1),
(2) Date: May 17, 2017

(87) PCT Pub. No.: WO2016/078887
PCT Pub. Date: May 26, 2016

(65) Prior Publication Data
US 2017/0336237 A1 Nov. 23, 2017

(30) Foreign Application Priority Data
Nov. 18, 2014 (EP) .................................. 14193610

(51) Int. Cl.
*G01F 19/00* (2006.01)
*B65D 33/16* (2006.01)
(Continued)

(52) U.S. Cl.
CPC ....... *G01F 19/002* (2013.01); *B65D 33/1658* (2013.01); *B65D 77/245* (2013.01); *B29C 45/2628* (2013.01); *B29K 2023/12* (2013.01)

(58) Field of Classification Search
CPC . G01F 19/002; B65D 33/1658; B65D 77/245; B29K 2023/12; B29C 45/2628; A47G 21/04
(Continued)

(56) References Cited

U.S. PATENT DOCUMENTS 513,772 A * 1/1894 Farmer .................... B42F 1/06
24/562
2,341,121 A 2/1944 Schaaff
(Continued)

FOREIGN PATENT DOCUMENTS

CN 10478440 A 11/1993
CN 101172387 A 5/2008
(Continued)

OTHER PUBLICATIONS

Wang Translate (Year: 2019).*
(Continued)

*Primary Examiner* — Ernesto A Grano
(74) *Attorney, Agent, or Firm* — K&L Gates LLP

(57) ABSTRACT

The present invention relates to a scoop (1) comprising a bowl (2) and a handle connected to the bowl (2) and comprising a clip (6). The clip (6) can be used for re-closing a bag containing a product to be dosed by the bowl (2). The clip (6) is delimited by a free edge (9), and there is a gap (12) between the free edge (9) of the clip (6) and handle edges (10) of regions of the handle (3) surrounding the clip (6). At least a part of the clip edge (9) and at least a part of the handle edges (10) delimiting the gap (12) are provided with teeth (13) in the form of teeth-shaped protrusions. The teeth (13) at the clip edge (9) and the teeth (13) at a proximate handle edge (10), respectively, are arranged at alternating positions along a longitudinal extension of the gap (12).

9 Claims, 4 Drawing Sheets

(51) Int. Cl.
*B65D 77/24* (2006.01)
*B29C 45/26* (2006.01)
*B29K 23/00* (2006.01)

(58) Field of Classification Search
USPC ........... 206/216; 24/67 R; 294/180; 220/756, 220/212.5, 212; D7/653, 654, 656, 664
See application file for complete search history.

(56) References Cited

U.S. PATENT DOCUMENTS

| | | | | |
|---|---|---|---|---|
| 2,884,214 | A | * | 4/1959 | Wrobel ................. F16L 3/1236 248/74.3 |
| 4,011,673 | A | * | 3/1977 | Levine ..................... G09F 3/16 40/641 |
| D297,334 | S | * | 8/1988 | Trent ............................. D19/34 |
| 5,065,977 | A | | 11/1991 | Desjardin |
| 5,398,384 | A | * | 3/1995 | Rinard ..................... B42F 1/06 24/67 R |
| 5,706,974 | A | * | 1/1998 | Murdick .............. B65D 51/246 206/230 |
| 7,716,842 | B2 | * | 5/2010 | Sumner-Trivisani ........................ A47G 21/02 16/422 |
| 8,266,770 | B2 | * | 9/2012 | Haas ......................... G09F 3/16 24/3.12 |
| D674,669 | S | * | 1/2013 | Gerli .............................. D7/642 |
| 2006/0011670 | A1 | * | 1/2006 | Pluchino ................. A47G 25/48 223/85 |
| 2006/0053638 | A1 | * | 3/2006 | Sumner-Trivisani ........................ A47G 21/02 30/298.4 |
| 2010/0326848 | A1 | | 12/2010 | Mangin et al. |
| 2010/0326851 | A1 | * | 12/2010 | Mangin ................ B65D 77/245 206/229 |
| 2011/0035945 | A1 | | 2/2011 | Chou |
| 2012/0042479 | A1 | * | 2/2012 | Haas ......................... G09F 3/16 24/7 |

FOREIGN PATENT DOCUMENTS

| | | |
|---|---|---|
| CN | 101628521 A | 1/2010 |
| DE | 20206618 | 8/2002 |
| FR | 1476217 | 4/1967 |
| FR | 1489764 | 7/1967 |
| JP | H11206545 A | 8/1999 |
| JP | 2003089289 A | 3/2003 |
| JP | 2012230128 | 11/2012 |
| WO | 0045135 | 8/2000 |

OTHER PUBLICATIONS

Haru Translate (Year: 2019).*
Russian Office Action for Appl No. PCT/EP2015/075068 dated May 25, 2019.

* cited by examiner

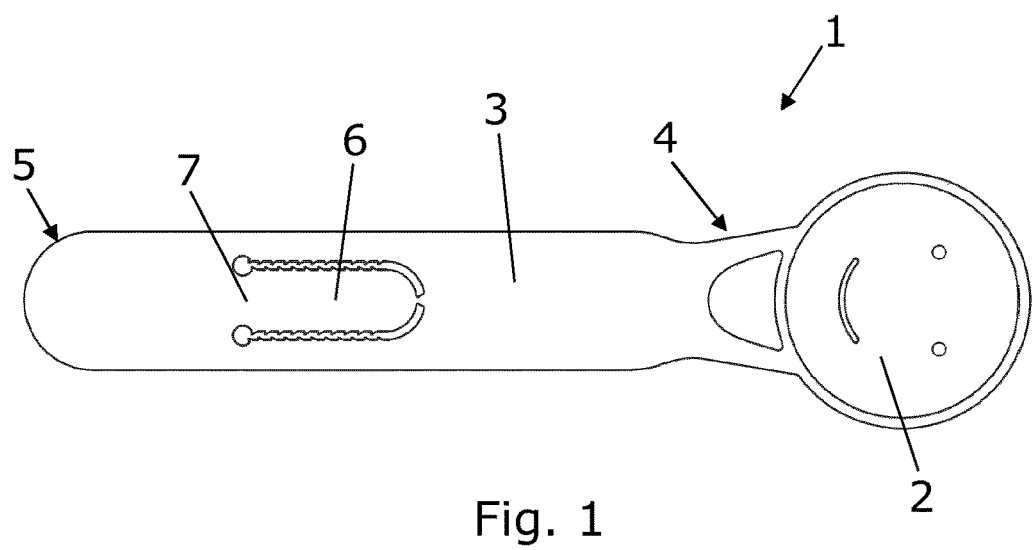
Fig. 1
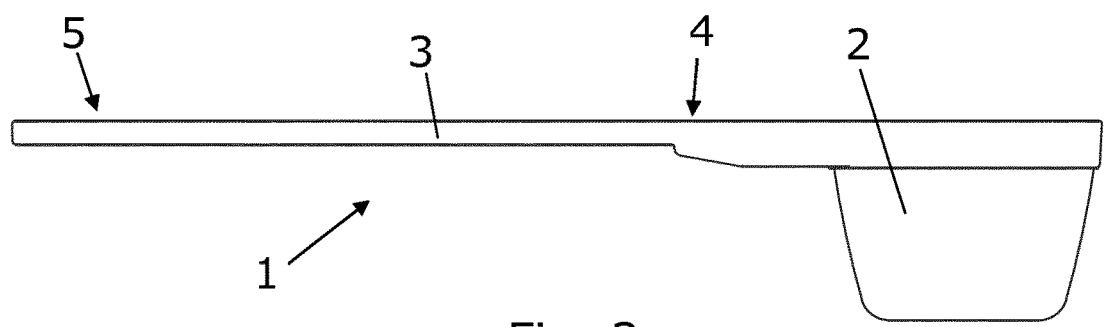
Fig. 2
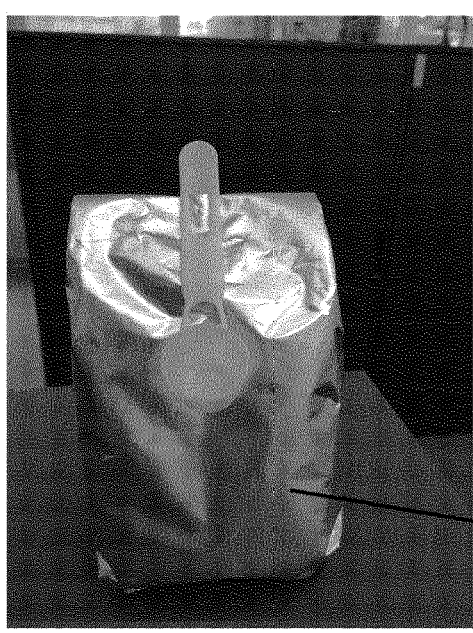
Fig. 3.a
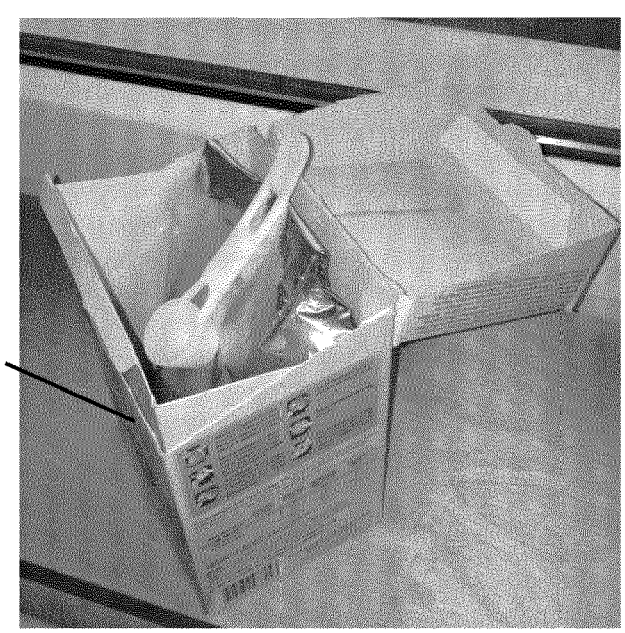
Fig. 3.b

CLIP-SCOOP WITH ANTI-SLIPPING FUNCTIONALITY

CROSS REFERENCE TO RELATED APPLICATIONS

The present application is a National Stage of International Application No. PCT/EP2015/075068, filed on Oct. 29, 2015, which claims priority to European Patent Application No. 14193610.4 filed on Nov. 18, 2014, the entire contents of which are being incorporated herein by reference.

FIELD OF THE INVENTION

The present invention relates to a scoop suitable for dosing a product in powder or granulate form and for re-closing a bag containing the product by use of a built-in clip. In particular the invention relates to such a scoop with means for preventing the clip-part of the scoop from unintentionally slipping off the re-closed bag.

BACKGROUND OF THE INVENTION

A large number of consumer products is provided in powder or granulate form which is to be used in measured amounts taken from a container or bag containing a larger amount of the product for multiple uses. An example of such a product is milk powder. To ease the use, the packaging is often provided with a scoop having the size of the bowl adapted to facilitate dosing of the desired amount of that specific product for the intended use. A problem with some types of scoops is that in order to have them at hand when needed, they are stored in the container or bag together with the product. This may result in the scoop being hidden in the powder or granulate product itself when needed or that the product sticks to the hand of the user picking up the scoop. Especially for products kept in a bag, this problem has been solved for known scoops by providing them with means for fastening them to the outside of the bag after opening, e.g. by a clip which can be fastened to a folded-up part of the bag. An advantage thereof is that the clip can at the same time be used to re-close the bag. An example of such a scoop is known from US 2010/0326848. However, a problem with these known clip-scoops is that they do not always stay in place but tend to slide off the bag. This is especially the case when the bag is close to empty, because in such circumstances a user tends to fold the empty upper part of the bag several times so that a large amount of bag material has to be held by the clip. Furthermore, the laminate materials used for storing powder products are typically quite smooth which adds to the risk of slipping of a clip-scoop.

For some products, the bag containing the product in powder or granulate form is stored inside an outer container, such as a cardboard box. Such an outer container may serve a number of purposes including easy stacking and further protection against the outer environment. In that case it can be a problem with some known types of packaging to ensure that there is enough room above the bag to ensure that the clip-scoop can stay in place on the re-closed bag without being pushed off by the closing of the lid of the outer container. This may especially be a problem when the bag is nearly full so that it takes up most of the space inside the container.

Various types of clip-scoops are known including some where the handle of the scoop with the clip resembles a clothes-peg; such a scoop is known from CN201617591U.

A disadvantage of such a clip-scoop is that it is made from multiple parts, including a metal spring, which have to be assembled as part of the manufacturing process. This leads to increased cost which is not desired at least for scoops that are intended to be provided together with each container of the product.

Hence, an improved scoop would be advantageous, and in particular a more efficient and/or reliable scoop would be advantageous.

Object of the Invention

It is an object of the present invention to provide a clip-scoop which can be used to both dose a desired amount of a product and to re-close a bag in which such a product is kept after the first opening, the clip-scoop having a larger resistance against slipping off the re-closed bag than known clip-scoops.

It is another object of the present invention to provide a clip-scoop which is easy to fasten to a rolled-up end of a bag, possibly using just one hand.

It is another object of at least some embodiments of the invention to provide a clip-scoop which takes up only limited space above the re-closed bag so that it is easily stored inside an outer container.

It is another object of at least some embodiments of the present invention to provide a clip-scoop having a geometry which allows for stacking of a plurality of clip-scoops.

It is a further object of the present invention to provide an alternative to the prior art.

In particular, it may be seen as an object of the present invention to provide a clip-scoop that solves the above mentioned problems of the prior art.

SUMMARY OF THE INVENTION

Thus, the above described object and several other objects are intended to be obtained in a first aspect of the invention by providing a scoop comprising:
   a bowl and
   a handle having a proximal end connected to the bowl, the handle extending to a distal end,
wherein:
   the handle comprises a clip having a clip base connected to a region of the handle comprising the distal end, and
   except for at the clip base, the clip is delimited by a free edge where the clip is not connected to the handle, the clip protruding towards the proximal end of the handle, and
   there is a gap between the free edge of the clip and handle edges of regions of the handle surrounding the clip,
the scoop being further characterized in that:
   at least a part of the clip edge and at least a part of the handle edges delimiting the gap are provided with teeth in the form of teeth-shaped protrusions, and
   the teeth at the clip edge and the teeth at a proximate handle edge, respectively, are arranged at alternating positions along a longitudinal extension of the gap.

In a presently preferred embodiment, the gap, and thus also the clip edge and the handle edges delimiting the gap, comprise straight parts. Preferably, the teeth are provided along at least part of the straight parts of the clip edge and of the handle edges delimiting the gap, such as along at least 50% of or along substantially the whole of the length of the straight parts of such edges. In an even more preferred embodiment, the straight parts of the clip edge and of the handle edges delimiting the gap are directed in the longitudinal direction of the handle. In a most preferred embodiment, there are no teeth along the curved parts of the clip edge and of the handle edges delimiting the gap.

In a presently preferred embodiment the gap, and thus also the edges of the clip, are substantially U-shaped with the straight edges of the U in the longitudinal orientation of the handle. For such an embodiment, the teeth are preferably provided along the straight edges of the U, such as along at least 50% of the length of the straight edges. In the embodiments shown in the figures, the teeth are provided substantially along the whole of the straight parts of the gap. Preferably there are no teeth along the curved part of the U-shaped gap whereby it has been found easier to fasten the clip on a folded-up bag. In alternative embodiments, the gap and the clip have other shapes, such as V-shape.

An advantage of such teeth as described above is that a better grip is obtained than for clips without teeth, so that the risk of the scoop sliding off a folded-up bag is significantly reduced as compared to known scoops. As part of the design of the geometry of the scoop for a given application, it also has to be ensured that the combination of the gap and the teeth results in a clip-scoop which can easily be fastened to the folded-up bag without significantly damaging, such as piercing, the bag material.

In the following, both of the words "scoop" and "clip-scoop" are used interchangeably.

By "alternating" is preferably meant that the teeth at one edge of the gap are arranged offset in the longitudinal direction of the gap with respect to teeth at the opposite edge of the gap. This will be clearer from the figures. Hereby the arrangement of the clip-scoop at a folded-up part of a bag is facilitated without the clip bending too much out of the plane of the handle; this again counteracts an unintended sliding of the clip.

The scoop is preferably symmetrical around a longitudinal axis of the handle. This has been found to provide an efficient and easy handling for the user of the scoop. Furthermore, it is also advantageous in regard to the manufacturing of the scoop by injection moulding as a symmetrical shape makes it easier to ensure that there is no deformation due to release of stresses from the manufacturing process, so that warping is avoided and the handle stays in one plane. This is relevant both for aesthetic reasons but also to enable stacking of scoops.

In presently preferred embodiments of the invention, there may be a transverse distance between neighbouring parts of the teeth extending from opposite edges of the gap, the transverse distance being perpendicular to the longitudinal extension of the gap. By "neighbouring parts" is preferably meant the parts of the teeth that are closest to teeth at the opposite edge of the gap; i.e. the inner most parts of the teeth.

By "transverse distance" is preferably meant that there is a gap between the teeth in the orientation parallel to the width of the gap. Or in other words that it would be possible to insert into the gap a sheet of material oriented perpendicular to the plane of the gap, provided that the thickness of that sheet is thinner than the transverse distance. The neighbouring parts of the teeth would thus touch a sheet of material having a thickness equal to the transverse distance and inserted into the gap. This will be more clearly seen in the figures.

The transverse distance may be of a size being between a fifth and a third, such as approximately a fourth, of the width of the gap.

Each tooth may comprise a first and a second tooth edge which meet at a tip. In such an embodiment, the tips of the teeth would be the neighbouring parts as mentioned above. In alternative embodiments, one or more parts of the teeth may have a curved configuration as long as the design still ensures a good gripping of the bag materials which the clip-scoop is intended to keep closed.

In the embodiments wherein each tooth comprises a first and a second tooth edge which meet at a tip, the angle between the first and the second edges of each of the teeth may be between 45° and 75°, such as between 50° and 70°, preferably approximately 60°.

The longitudinal distance between one specific point of a tooth and the corresponding point of the nearest tooth along the same edge in the longitudinal direction of the gap may be between 1 and 2 times, such as approximately 1.5 times, the width of the gap. Some examples of measures will be given in relation to the detailed description of the figures. In the embodiments wherein each tooth comprises a first and a second tooth edge which meet at a tip, the longitudinal distance between two consecutive teeth along one edge of the gap is typically measured between the tips of the teeth.

The clip edge and the handle edges may comprise sections between the teeth being parallel to the longitudinal direction of the gap. For such embodiments, the width of the gap can be defined as the transverse distance between these parallel sections. In presently preferred embodiments this means that the teeth at one edge of the gap are arranged opposite the corresponding parallel sections of the other edge of the gap.

In presently preferred embodiments of the invention, a hole is provided at each end of the gap, wherein a transversal dimension of the hole is larger than the width of the gap. By "end of the gap" is preferably meant the area next to the clip base, i.e. the region from where the clip protrudes. The hole may preferably be substantially circular to minimize the risk of cracks in the material due to stress concentrations when the clip is bent out of the plane to insert bag material therein. In such embodiments wherein the hole is substantially circular, the hole would be having a larger diameter than the width of the gap.

The clip may have a length which is between 10% and 40% of a total length of the scoop, such as between 15% and 25%, preferably approximately 20%.

The length of the part of the scoop from the base of the clip and to an outermost edge of the distal end of the handle may be at most 1.5 times the length of the clip, preferably not longer than the length of the clip. Hereby the risk of the scoop being pushed off the re-closed bag containing the product by the closing of the lid of an outer container is lowered.

Furthermore, the length of the part of the scoop from the clip and to an outermost edge of the bowl may be about three times the length of the clip.

In presently preferred embodiments of the invention, the handle extends substantially in a plane. More preferably the scoop also has an overall geometry which allows stacking of a plurality of scoops. This facilitates the storing and handling of the scoops until they are packed into individual packaging during manufacturing. In some embodiments, the overall geometry of the scoop may allow stacking of a plurality of scoops in alternating opposite directions. This will be advantageous for some dimensions of the clip-scoops, such as those shown in the figures.

In a second aspect, the present invention relates to the use of a clip-scoop as described above for dosing a product in powder or granulate form, such as a food product, for example milk powder.

In a third aspect, the present invention relates to a product in powder or granulate form stored in an inner bag contained in an outer packaging, such as a box, the outer packaging further containing a scoop as described above.

In a fourth aspect, the present invention relates to a process for manufacturing at least one scoop as described above by injection moulding, the process comprising the following steps:
provide a mould having at least one mould cavity adapted to result in the at least one scoop being manufactured,
injecting molten plastic under pressure into the at least one mould cavity,
cooling the mould to solidify the injected plastic,
opening the mould, and
ejecting the at least one scoop from the at least one mould cavity.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The scoop according to the invention will now be described in more detail with regard to the accompanying figures. The figures show one way of implementing the present invention and is not to be construed as being limiting to other possible embodiments falling within the scope of the attached claim set.

FIG. 1 shows a top view of a scoop according to the present invention.

FIG. 2 shows a side view of the scoop in FIG. 1.

FIG. 3 shows how the scoop in FIG. 1 can be used to re-close a bag which bag may be stored inside an outer container.

DETAILED DESCRIPTION OF AN EMBODIMENT

Figure 4:
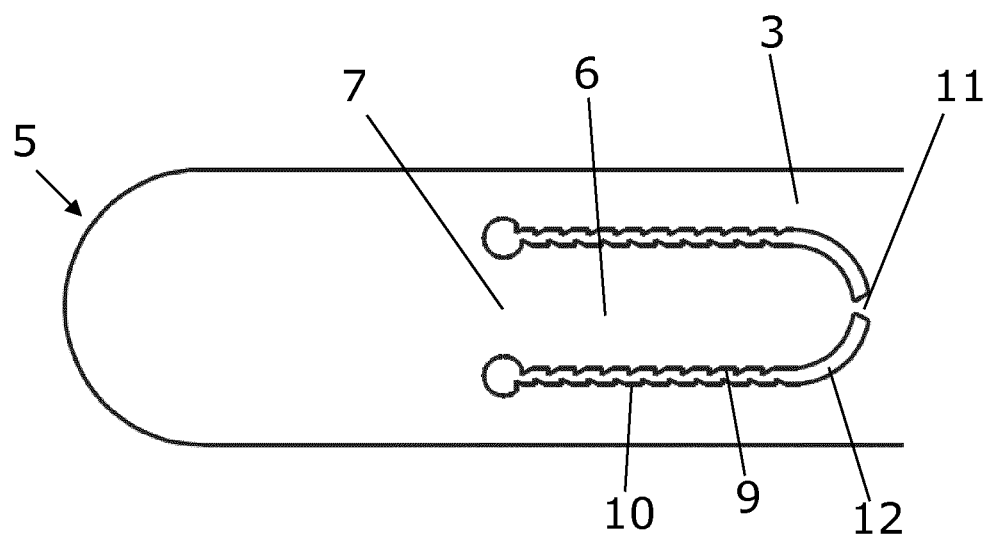
FIG. 4 shows a more close-up of the clip part of the scoop in FIG. 1.

FIG. 1 shows a top view of a scoop 1 according to the present invention, and FIG. 2 shows a side view of the scoop 1 in FIG. 1. The scoop 1 may typically be manufactured by injection moulding of a plastic material, such as polypropylene. The scoop 1 comprises a bowl 2 and a handle 3 having a proximal end 4 connected to the bowl 2, the handle 3 extending to a distal end 5. The handle comprises a clip 6 having a clip base 7 connected to a region of the handle 3 comprising the distal end 5.

FIG. 3.a shows a clip-scoop 1 which has been used to re-close a bag 8 containing the product to be dosed by the bowl 2 of the scoop 1. The scoop 1 may e.g. be used for dosing a desired amount of a food product, such as an amount of milk powder for preparing a feeding bottle. The thickness of the folded-up part of the bag material 8 typically depends on how full the bag is, since a user tends to fold-up all the excess material. FIG. 3.b shows an example of such a use wherein the product is stored in an inner bag 8 contained in an outer packaging 28 further containing the scoop 1 ready for use by the consumer. FIG. 3.b shows the situation where the scoop has already been used to re-close the inner bag.

Studies made in relation to the present invention have shown that the use of a clip-scoop 1 according to the present invention significantly reduces the risk of the scoop 1 slipping off the bag 8 even when a large amount of bag material is inserted into the gap 12 around the clip 6 of the scoop 1. This is due to the fact that at least a part of the clip edge and at least a part of the handle edges 10 delimiting the gap 12 are provided with teeth 13 in the form of teeth-shaped protrusions as shown in FIG. 4 which shows a close-up of the clip part of the scoop 1 in FIG. 1.

Except for at the clip base 7, the clip 6 is delimited by a free edge 9, also referred to as the clip edge, where the clip 6 is not connected to the handle 3, the clip 6 protruding towards the proximal end 4 of the handle 3. There is a gap 12 between the free edge 9 of the clip 6 and handle edges 10 of regions of the handle 3 surrounding the clip 6. As shown in FIGS. 1 and 4, the gap 12 may be interrupted by a small connection 11 between the clip 6 and the handle 3. The purpose of this small connection 11 is to ensure a desired flow of plastic during the injection moulding of the scoop 1. The size is to be so small that it can easily be broken at a first use of the scoop 1 for the re-closing of a bag 8 as explained above.

The teeth 13 at the clip edge and the teeth 13 at a proximate handle edge 10, respectively, are arranged at alternating positions along a longitudinal extension of the gap 12 thereby providing a good grip of the bag material 8. Studies of different designs also revealed that good holding properties are obtained when the clip 6 has a length which is between 10% and 40% of a total length of the scoop 1, and preferably approximately 20%. The actual length and position of the clip 6 for a given purpose may be determined by experimentation as a part of the designing of the packaging for the product.

Figure 5:
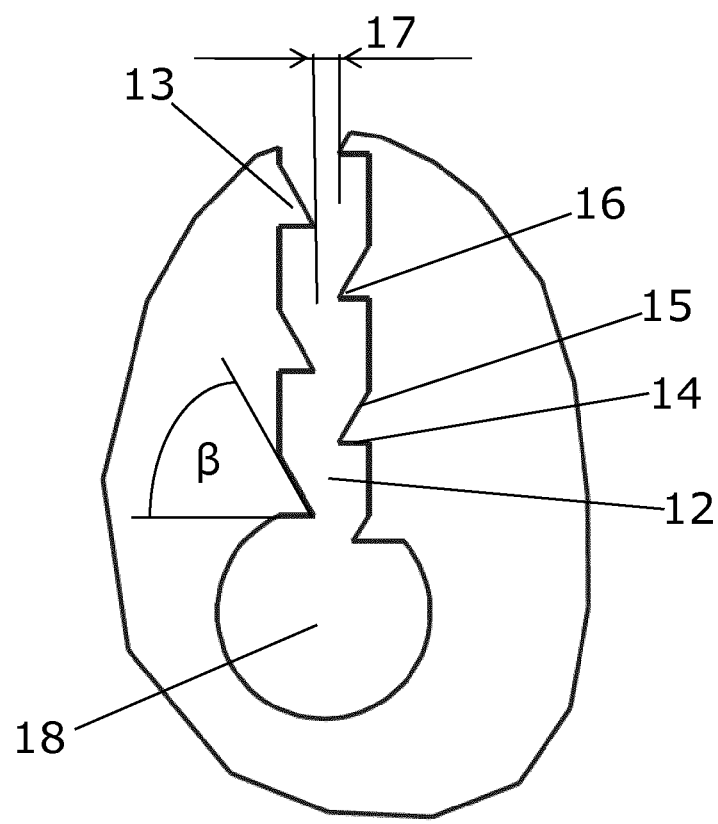
FIG. 5 shows a further close-up of the region around an end of the gap around the clip in FIG. 4.

FIG. 5 shows a further close-up of the region around an end of the gap 12 around the clip 6 in FIG. 4. This is an exemplary and presently preferred embodiment of the invention, but other shapes and relative dimensions of the teeth-shaped protrusions 13 are also covered by the invention.

In the embodiment shown in FIG. 5, each tooth 13 comprises a first and a second tooth edge 14,15 which meet at a tip 16. There is a transverse distance 17 between the tips 16 of teeth 13 extending from opposite edges of the gap 12, the transverse distance 17 being perpendicular to the longitudinal extension of the gap 12. This combination between a transverse distance 17 and the arrangement and design of the teeth 13 has been found particularly suitable for ensuring that the scoop 1 does not slide and fall off the folded-up bag material 8 even for different thicknesses and smoothness of the bag material 8. In presently preferred embodiments of the invention, the transverse distance 17 is of a size being approximately a fourth of the width of the gap 12. As mentioned above, the width of the gap can be defined as the transverse distance between the parallel sections of the edges of the gap 12.

Typical relative dimensions of a clip-scoop 1 according to the present invention are shown in FIG. 5 as the following: The longitudinal distance between two neighbouring teeth tips 16 in the longitudinal direction of the gap 12 is approximately 1.5 times the width of the gap 12. The length of each of the teeth 13 when measured along the longitudinal direction of the gap 12 is approximately 2.5 times the transverse distance 17 between two tips 16.

To give an idea of possible dimensions for a clip-scoop 1 intended to be used for milk powder, the overall length of the scoop 1 may be in the order of 115 mm, the length of the clip may be in the order of 16 mm, and the width of the gap may be in the order of 1 mm, and the transverse distance may be in the order of 0.25 mm.

For a scoop 1 wherein each tooth 13 comprises a first and a second tooth edge 14,15 which meet at a tip 16 as the one shown in the figures, the angle β between the first and the second edges 14,15 of each of the teeth 13 may be between 45° and 75°; in the embodiment shown in FIG. 5, the angle is approximately 60°. This angle β has been found to give a good product both with respect to the injection moulding process and with respect to the intended use of the scoop 1.

A further feature which is most clearly seen in FIG. 5 is that in presently preferred embodiments of the invention, a hole 18 is provided at each end of the gap 12, wherein a transversal dimension of the hole 18 is larger than the width of the gap 12. In the embodiment shown in the figures, the hole 18 is circular and has a larger diameter than a width of the gap 12. The hole 18 will typically be substantially circular to minimize the risk of cracks in the material due to stress concentrations when the clip 6 is bent out of the plane to insert bag material 8 therein. The actual dimensions may differ from those shown in the figure.

Figure 6:
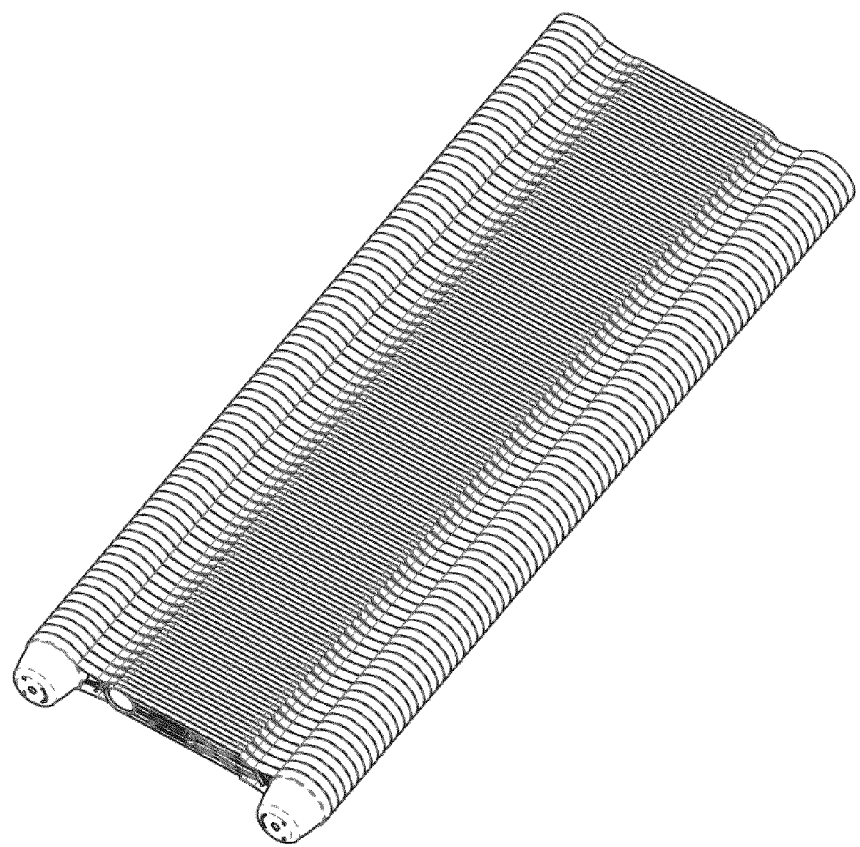
FIG. 6 shows a stack of scoops as the one shown in FIG. 1.

FIG. 6 shows how the overall geometry of the scoop 1 has been designed to allow stacking of a plurality of scoops 1 in alternating opposite directions. This has been obtained by the handle 3 extending substantially in a plane and in that the scoop 1 has an overall geometry which allows such stacking of a plurality of scoops 1. This means that the scoops 1 can be stored and supplied to the packaging machines stacked which is advantageous for logistic reasons. A design which allows stacking of a plurality of scoops 1 in alternating opposite directions will be advantageous for some dimensions of the clip-scoops, such as those shown in the figures wherein the part of the handle 3 close to the bowl 2 is thicker than the part of the handle further away from the bowl 2.

Figure 7:
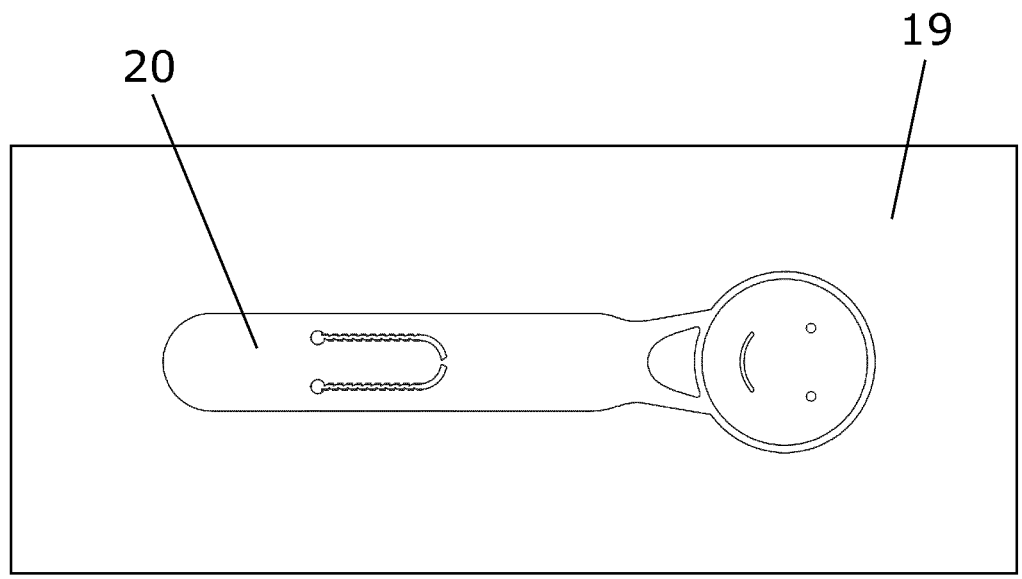
FIG. 7 shows schematically a mould part for injection moulding of a scoop according to the present invention.

A scoop 1 as described above may be manufactured by injection moulding. FIG. 7 shows schematically a mould part 19 for such injection moulding. Only one mould part 19 is shown for illustrative purposes only. Details such as the inlet to the mould cavity 20 have been omitted from the figure for illustrative purposes only. But possible geometries, dimensions and positions thereof will have to be determined as part of the design process. When the mould part is used together with another mould part in the injection moulding, the mould parts together form a mould cavity 20 having a geometry resulting in the desired geometry of the scoop 1. In the embodiment shown, only one scoop 1 is made at a time. However, it will also be possible to use a mould design resulting in multiple scoops being injection moulded simultaneously.

Figure 8:
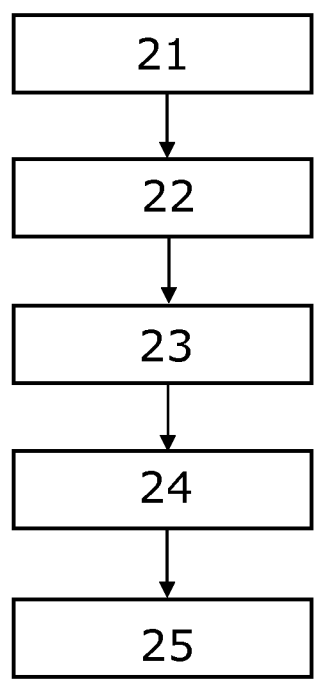
FIG. 8 shows schematically a flow chart of an injection moulding process for manufacturing a scoop according to the present invention.

FIG. 8 shows schematically a flow chart of an injection moulding process for manufacturing a scoop 1 according to the present invention. The process comprising the following steps:
  providing (21) a mould (19) having at least one mould cavity (20) adapted to result in the at least one scoop (1) being manufactured,
  injecting (22) molten plastic under pressure into the at least one mould cavity (20),
  cooling (23) the mould (19) to solidify the injected plastic,
  opening (24) the mould (19), and
  ejecting 25) the at least one scoop (1) from the at least one mould cavity (20).

The scoop 1 may e.g. be made from polypropylene but other materials may also be used. The actual process parameters to be used for a given manufacturing process will depend on material type, geometry and size of the scoop 1, as well as whether one or more scoops 1 are made in one process cycle. The choice of parameters will be well known to a person skilled in the art, possibly aided by computer simulations.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. A scoop comprising:
a bowl; and
a handle having a proximal end connected to the bowl, the handle extending to a distal end,
wherein:
the handle comprises a clip having a clip base connected to a region of the handle comprising the distal end,
except for at the clip base, the clip is defined by a free edge where the clip is not connected to the handle, the clip protruding towards the proximal end of the handle,
a gap is defined between the free edge of the clip and handle edges of regions of the handle surrounding the clip,
at least a part of the free edge of the clip and at least a part of the handle edges delimiting the gap are provided with teeth in the form of teeth-shaped protrusions, and
the teeth at the free edge of the clip and the teeth at a proximate handle edge, respectively, are arranged at alternating positions along a longitudinal extension of the gap,
wherein a longitudinal distance between one point of a tooth and a corresponding point of a nearest tooth along a same edge in a longitudinal direction of the gap is between 1 and 2 times a width of the gap,
wherein each tooth comprises a first and a second tooth edge which meet at a tip, the teeth extending from the free edge of the clip each have an individual length defined by the distance between the tip and the free edge of the clip, the teeth extending from the handle edges each have an individual length defined by the distance between the tip and the corresponding handle edge, and the total of the individual length of each of the teeth extending from the free edge of the clip and the individual length of each of the teeth extending from the handle edges is less than the gap such that the teeth extending from the free edge of the clip do not overlap the teeth extending from the handle edges in a longitudinal direction of the gap.

2. The scoop according to claim 1, wherein a transverse distance between neighbouring parts of the teeth is between a fifth and a third of the width of the gap.

3. The scoop according to claim 1, wherein an angle between the first and the second edges of each of the teeth is between 45° and 75°.

4. The scoop according to claim 1, wherein a hole is provided at each end of the gap, wherein a transversal dimension of the hole is larger than the width of the gap.

5. The scoop according to claim 1, wherein the clip has a length which is between 10% and 40% of a total length of the scoop.

6. The scoop according to claim 1, wherein a length of a part of the scoop from the clip base and to an outermost edge of the distal end of the handle is at most 1.5 times a length of the clip.

7. The scoop according to claim 1, wherein the handle extends substantially in a plane.

8. The scoop according to claim 1, wherein the proximal end of the handle is thicker than the distal end of the handle.

9. A scoop comprising:
a bowl; and
a handle having a proximal end connected to the bowl, the handle extending to a distal end,
wherein:
the handle comprises a clip having a clip base connected to a region of the handle comprising the distal end,
except for at the clip base, the clip is defined by a free edge where the clip is not connected to the handle, the clip protruding towards the proximal end of the handle,
a gap is defined between the free edge of the clip and handle edges of regions of the handle surrounding the clip,
at least a part of the free edge of the clip and at least a part of the handle edges delimiting the gap are provided with teeth in the form of teeth-shaped protrusions, and
the teeth at the free edge of the clip and the teeth at a proximate handle edge, respectively, are arranged at alternating positions along a longitudinal extension of the gap,
wherein a longitudinal distance between one point of a tooth and a corresponding point of a nearest tooth along a same edge in a longitudinal direction of the gap is between 1 and 2 times a width of the gap,
wherein each tooth comprises a first and a second tooth edge which meet at a tip, the teeth extending from the free edge of the clip each have an individual length defined by the distance between the tip and the free edge of the clip, the teeth extending from the handle edges each have an individual length defined by the distance between the tip and the corresponding handle edge, and the total of the individual length of each of the teeth extending from the free edge of the clip and the individual length of each of the teeth extending from the handle edges is less than the gap such that the teeth extending from the free edge of the clip do not overlap the teeth extending from the handle edges in a longitudinal direction of the gap,
wherein a hole is provided at each end of the gap, wherein a transversal dimension of the hole is larger than the width of the gap,
wherein a first section of the free edge of the clip faces a first handle edge of the handle edges; and the teeth comprise (i) a first tooth extending from the first section of the free edge of the clip at a first longitudinal distance along the gap from the hole, (ii) a second tooth extending from the first handle edge at a second longitudinal distance along the gap from the hole, (iii) a third tooth extending from the first section of the free edge of the clip at a third longitudinal distance along the gap from the hole, (iv) a fourth tooth extending from the first handle edge at a fourth longitudinal distance along the gap from the hole, and (iii) a fifth tooth extending from the first section of the free edge of the clip at a fifth longitudinal distance along the gap from the hole, wherein the first distance is less than the second distance which is less than the third distance which is less than the fourth distance which is less than the fifth distance.

\* \* \* \* \*